(12) United States Patent
Tullis et al.

(10) Patent No.: US 8,590,779 B2
(45) Date of Patent: Nov. 26, 2013

(54) VALUE TOKEN CONVERSION

(75) Inventors: John Tullis, Cambridge, MA (US); Shaw Li, San Francisco, CA (US); Lisa McFarland, Leesburg, VA (US)

(73) Assignee: Visa International Service Association, San Francisco, CA (US)

( * ) Notice: Subject to any disclaimer, the term of this patent is extended or adjusted under 35 U.S.C. 154(b) by 51 days.

(21) Appl. No.: 13/171,256

(22) Filed: Jun. 28, 2011

(65) Prior Publication Data

US 2012/0024946 A1 Feb. 2, 2012

Related U.S. Application Data

(60) Provisional application No. 61/359,734, filed on Jun. 29, 2010.

(51) Int. Cl.
*G06F 17/00* (2006.01)
*G06K 5/00* (2006.01)
*G06Q 40/00* (2012.01)

(52) U.S. Cl.
USPC ............. 235/379; 235/375; 235/380; 705/35; 705/44; 705/45

(58) Field of Classification Search
USPC .......... 235/379, 375, 380; 382/139, 168, 293; 705/26, 35, 44, 45
See application file for complete search history.

(56) References Cited

U.S. PATENT DOCUMENTS

| | | |
|---|---|---|
| 5,790,677 A | 8/1998 | Fox et al. |
| 5,826,241 A | 10/1998 | Stein et al. |
| 5,850,446 A | 12/1998 | Berger |
| 5,898,777 A | 4/1999 | Tycksen et al. |
| 5,956,695 A | 9/1999 | Carrithers et al. |
| 6,012,048 A | 1/2000 | Gustin et al. |
| 6,072,870 A | 6/2000 | Nguyen |
| 6,208,973 B1 | 3/2001 | Boyer et al. |
| 6,366,893 B2 | 4/2002 | Hannula et al. |
| 6,609,113 B1 | 8/2003 | O'Leary et al. |
| 6,704,714 B1 | 3/2004 | O'Leary et al. |
| 6,932,268 B1 | 8/2005 | McCoy et al. |
| 6,999,943 B1 | 2/2006 | Johnson et al. |
| 7,003,495 B1 | 2/2006 | Burger et al. |
| 7,058,611 B2 | 6/2006 | Kransley et al. |
| 7,103,579 B1 | 9/2006 | Phillips et al. |
| 7,124,937 B2 | 10/2006 | Myers et al. |
| 7,156,294 B2 | 1/2007 | Roth |
| 7,269,575 B1 | 9/2007 | Concannon et al. |
| 7,313,545 B2 | 12/2007 | Degen et al. |
| 7,321,874 B2 | 1/2008 | Dilip et al. |
| 7,660,771 B2 | 2/2010 | Orcutt |
| 8,320,657 B1 * | 11/2012 | Burks et al. ................... 382/139 |
| 8,332,329 B1 * | 12/2012 | Thiele ............................. 705/64 |
| 8,407,141 B2 | 3/2013 | Mullen |
| 2001/0034702 A1 | 10/2001 | Mockett et al. |
| 2001/0037209 A1 | 11/2001 | Tarbutton et al. |

(Continued)

*Primary Examiner* — Thien M Le
*Assistant Examiner* — Claude J Brown
(74) *Attorney, Agent, or Firm* — Kilpatrick Townsend Stockton LLP (57) ABSTRACT

A method is disclosed. The method includes obtaining value token image data associated with the image of the value token, the value token image data being derived from an image of the value token obtained from a scanning device. The method also includes initiating verification of the value token. The method may also include (i) providing a temporary use account identifier correlated with the value token; and sending the temporary use account identifier to a user; or (ii) increasing the value of a prepaid account.

22 Claims, 8 Drawing Sheets

(56) References Cited

U.S. PATENT DOCUMENTS

| | | |
|---|---|---|
| 2002/0023053 A1 | 2/2002 | Szoc et al. |
| 2002/0032653 A1 | 3/2002 | Schutzer |
| 2002/0052841 A1 | 5/2002 | Guthrie |
| 2002/0152124 A1 | 10/2002 | Guzman et al. |
| 2002/0178112 A1 | 11/2002 | Goeller |
| 2003/0088462 A1 | 5/2003 | Carrithers et al. |
| 2003/0195819 A1 | 10/2003 | Chen et al. |
| 2004/0215560 A1 | 10/2004 | Amalraj et al. |
| 2005/0033609 A1 | 2/2005 | Yang |
| 2005/0184145 A1 | 8/2005 | Law et al. |
| 2006/0068897 A1 | 3/2006 | Sanford et al. |
| 2006/0074799 A1 | 4/2006 | Averyt et al. |
| 2006/0265298 A1 | 11/2006 | Lee et al. |
| 2006/0266821 A1 | 11/2006 | Zajkowski et al. |
| 2007/0124224 A1 | 5/2007 | Ayers et al. |
| 2007/0150411 A1 | 6/2007 | Addepalli et al. |
| 2007/0168234 A1 | 7/2007 | Rutkowski et al. |
| 2007/0255669 A1 | 11/2007 | Kashanov |
| 2007/0282743 A1 | 12/2007 | Lovelett et al. |
| 2007/0288377 A1 | 12/2007 | Shaked |
| 2008/0011825 A1 | 1/2008 | Giordano et al. |
| 2008/0021835 A1 | 1/2008 | Ginter |
| 2008/0033878 A1 | 2/2008 | Krikorian et al. |
| 2008/0086417 A1 | 4/2008 | Bykov |
| 2009/0119190 A1* | 5/2009 | Realini .................... 705/30 |
| 2009/0132415 A1* | 5/2009 | Davis et al. ............... 705/43 |
| 2009/0228370 A1* | 9/2009 | Shakkarwar ............... 705/26 |
| 2010/0082470 A1* | 4/2010 | Walach et al. ............. 705/35 |
| 2010/0094752 A1* | 4/2010 | Heath ....................... 705/40 |
| 2011/0191160 A1* | 8/2011 | Blackhurst et al. ...... 705/14.38 |
| 2011/0225058 A1 | 9/2011 | Patterson |

* cited by examiner

VALUE TOKEN CONVERSION

CROSS-REFERENCES TO RELATED APPLICATIONS

This application claims benefit under 35 U.S.C. §119(e) of U.S. Provisional Patent Application No. 61/359,734, filed on Jun. 29, 2010, the entire disclosure of which is incorporated herein by reference for all purposes.

BACKGROUND

In some instances, when consumers shop at a merchant, they pay using a personal check. Checks are issued to a consumer with an associated financial account, such as a checking account. At a point-of-sale, check verification services may use American Bankers Association (ABA) number, Bank Identifier Code (BIC), or other bank code routing. The ABA number, often referred to as the "transit routing number," is the nine-digit electronic address of a financial institution of the account. The BIC is a unique address that identifies financial institutions involved in international financial transactions and consists of eight or eleven characters comprising the first three or all four of the following components: Bank Code, Country Code, Location Code and Branch Code. BICs are allocated and managed by the Society for Worldwide Interbank Financial Telecommunication (SWIFT). The ABA number or BIC is encoded in the Magnetic Ink Character Recognition (MICR) line of all checks, and is assigned to each financial institution and each branch office of that financial institution. The associated checking account number is also encoded in the MICR line. The merchant scans the check and transmits MICR data to process transaction messages. When a check is cleared and settled, the check amount is directly deducted from the checking account identified from the checking account number and transit routing number. Therefore, the consumer must have sufficient funds in the checking account in order for the consumer's check to be cashed by a merchant and successfully clear and settle. However, consumers may still write checks to merchants when there are insufficient funds in the checking account, causing fees and lack of payment when a merchant tries to cash the check and the check does not clear. Checks are also vulnerable to fraud, as the merchant can only verify the consumer's identity, and cannot in real-time verify the check or checking account. While banks can electronically transmit the check data, the majority of check verification is accomplished in batch and may be significantly delayed.

Because check fund verification does not occur in real time, a merchant takes significant risk in accepting personal checks, and may not accept payment in the form of a personal check. From the merchant's perspective, check payments are slow as they take a longer time to clear and settle, therefore taking a long time to determine if there are sufficient funds in the checking account, or if the check is fraudulent. However, checks are still used by many consumers to pay for goods and services. It would be desirable to allow consumers that still use checks to use them, but to also allow them to be accepted at more places with added security for the merchant.

Another problem with checks (and other type of value tokens) is that they may have limited use in the payment card infrastructure. The payment card infrastructure is becoming more ubiquitous, and it would be desirable to better integrate checks and other value tokens with different payment card types.

Embodiments of the invention address these and other problems, individually and collectively.

BRIEF SUMMARY

Embodiments of the invention relate to a value token conversion processes, methods, and systems. A value token may include, but is not limited to, a check, a gift certificate, or voucher. Although value token to account identifier conversions are described in detail, as explained below, embodiments of the invention are not limited to value token to payment account conversions.

One embodiment of the invention is directed to a server computer apparatus comprising a processor and a computer readable storage medium, comprising code executable by the processor for implementing an method comprising: obtaining value token image data associated with the image of the value token, the value token image data being derived from an image of the value token obtained from a scanning device; initiating verification of the value token data; providing a temporary use (e.g., a one-time use) account identifier correlated with the value token; and sending the temporary use (e.g., one-time use) account identifier to a user. If a one-time use account identifier is used, it can only be used once in a single transaction.

Another embodiment of the invention is directed to a method comprising: obtaining value token image data associated with the image of the value token, the value token image data being derived from an image of the value token obtained from a scanning device; initiating verification of the value token data; providing a temporary use (e.g., one-time use) account identifier correlated with the value token; and sending the temporary (e.g., one-time use) account identifier to a user.

Another embodiment of the invention is directed to a scanning device, comprising: a processor; an imaging device capable of capturing images; and a computer-readable medium coupled to the processor. The computer-readable medium comprises code executable by the processor for implementing a method comprising: capturing an image of a value token; generating value token image data for the image of the value token; transmitting the value token image data; and receiving a temporary use (e.g., a one-time use) account identifier, wherein the temporary use (e.g., one-time use) account identifier is correlated with the value token.

Another embodiment of the invention is directed to a method, comprising: capturing an image of a value token using a scanning device, wherein the scanning device comprises an imaging device; generating value token data for the image of the value token; transmitting the value token image data; and receiving a temporary use (e.g., one-time use) account identifier, wherein the temporary use (e.g., one-time use) account identifier is correlated with the value token.

Another embodiment of the invention is directed to a method comprising: obtaining value token image data associated with the image of the value token, the value token image data being derived from an image of the value token obtained from a scanning device; initiating verification of the value token; and increasing a value of a prepaid account. Other embodiments of the invention relate to server computers configured to implement the method and a computer readable medium comprising code for causing a processor in a server computer to implement the method.

Another embodiment of the invention is directed to a method comprising capturing an image of a value token using an imaging device in a scanning device; generating value token image data for the image of the value token; transmitting the value token image data to a server computer; and receiving a notification that a prepaid account has increased in value.

These and other embodiments of the invention are described in further detail below.

DETAILED DESCRIPTION

In an embodiment of the invention, a user may wish to use a value token, such as a personal check, at the point-of-sale (POS) terminal to conduct a payment transaction at a merchant. The merchant may not accept personal checks, but it may accept payment cards such as credit and debit cards. To conduct the payment transaction using a check, the user can capture an image of the check using a scanning device, and can send (e.g., transmit) it to a server computer, which may be operated by an issuer or some other entity. Image data, which may include the amount of the check, and the ABA routing number or BIC code on the check, can be extracted from the image of the check. The data extraction can occur at the scanning device prior to the transmission of the image of the value token to the issuer, or the data extraction can occur at the server computer operated by issuer after receiving the image from the user.

When the issuer receives the image of the check and the data has been extracted from the image of the check, the issuer (or the server computer operated by the issuer) authenticates the check by analyzing the image data. The image data may be check data if the value token is a check. The check data can comprise the user's personal information (e.g., a name, address, and other identification data), and financial information (e.g., transit routing number and checking account number). The issuer uses the check data to verify the check. The verification process may include at least one or more of the following: verifying that the user's identity is authentic, verifying that the checking account number on the check is associated with the user, verifying the ABA routing number or BIC code corresponds with the user's bank, and verifying that there are sufficient funds in the checking account to complete the desired payment transaction. In some embodiments, the issuer may also perform a credit history check on the user during the verification process for short term loans or credit lines.

Once the check data has been verified as authentic, the issuer (or the server computer operated by the issuer) provides (e.g., generates) a one-time use account identifier correlated with the check. The one-time use account identifier is an example of a temporary use account identifier. The one-time use account identifier that is generated is correlated to and can be unique to the check. In some embodiments, the one-time use account identifier (or the temporary use account identifier) may be generated in a random fashion or with an algorithm that uses information unique to the transaction, merchant, value token, or user. With respect to the latter, an algorithm may produce a one-time use account identifier such as 4288 1111 0000 5172 as a one-time use PAN (primary account number) along with an expiration date such as 01/2013. To generate these values, the algorithm could use inputs including any of the value token image data (e.g., a check number, a checking account number, an RTN, or any other data element described herein), a user's password, a user's phone number, a merchant ID, a timestamp relating to the time of the transaction to be conducted or the time of the request for the one-time use account identifier, etc. This will ensure that the temporary or single-use identifier is unique to the user and/or transaction, thereby decreasing the risk of issuing duplicate identifiers.

The one-time use account identifier is then sent to the user. For example, if the user's scanning device is a phone with a camera, the server computer operated by the issuer can send the one-time use account identifier to the phone over an appropriate telecommunications network. Once received, the one-time use account identifier may be stored in a secure element in the phone.

More specifically, the issuer can send the one-time user account identifier to the user via a communications network interface. The user may receive the one-time use account identifier on the scanning device (e.g., smartphone) and can use it immediately for a desired payment transaction. The one-time use account number can be used at the merchant POS terminal as an acceptable form of payment. Since the account number can be in the form of a traditional payment card account identifier, it can be widely accepted by merchants that accept payment cards for purchases. In some embodiments, the time window between the time that the value token is scanned and the time that the user can receive the one-time use account number can be less than one day, one hour, or five minutes. It may be received by the user before the value token is cleared and settled with the bank that issued the value token.

The user can provide the one-time use account identifier from the scanning device to the merchant's POS terminal in any suitable manner. For example, the scanning device may pass the one-time use account identifier to the POS terminal using a contactless (e.g., RF) transmission mechanism. The user may alternatively simply provide the one-time use account number to the merchant, and an employee of the merchant can input the one-time use account identifier into the POS terminal.

The merchant then processes the payment transaction with the one-time use account identifier. The merchant's POS terminal may generate an authorization request message including the one-time use account identifier, the transaction amount, and other information, and it may be sent to an acquirer and a payment processing network (or a server computer in the payment processing network). The payment processing network is coupled to the issuer and the issuer can verify and authorize (or not authorize) the authorization request message, which includes the one-time use account identifier.

In some embodiments, the issuer can initiate a clearing and settling process using the one-time account identifier, which is correlated with the check. This is done by communicating with a settlement network and a bank associated with the checking account of the user. When the one-time account identifier is cleared and settled, the issuer (or the server computer operated by the issuer) communicates to the payment processing network that the payment transaction is approved. The payment processing network then forwards the approval to the acquirer and merchant to complete the payment transaction with the user at the POS terminal.

Prior to discussing the specific embodiments of the invention, a further description of some terms can be provided.

An "issuer" can be any institution capable of issuing a temporary account identifier or capable of receiving value tokens and modifying payment card transaction accounts. Issuers are typically banks, but can be other types of institutions (e.g., large retailers).

A "value token" can include any suitable type of manifestation of value, and may include checks (e.g., personal checks), gift certificates, vouchers, coupons, etc. Value tokens may be embodied by paper or some other tangible, but permanent information storage medium. Other value tokens may be provided electronically (e.g., an electronic barcode displayed on a phone, where the barcode represents some form of currency other than cash). The value token may be associated with some form of currency, and may have some cash value. For example, the value token can be in the form of points, rewards, credits, virtual currency, or other value, and they can be convertible to cash.

An "image of a value token" may be in any suitable electronic image format (e.g., JPEG, GIF, and PNG). The image may be captured through any digital or electronic means of imaging (e.g., photographing, photocopying, scanning, etc.). The image may be static or dynamic.

"Value token image data" can be data that is derived or generated from the image of the value token. The value token image data may include decoded MICR data, or text extracted through Optical Character Recognition (OCR) from the image of the value token, or any other image processing application. Value token image data may also include the user's personal information (e.g., name, address), a transit routing number, a checking account number, a points or rewards account identifier, a value amount, or any other suitable data used to verify and authenticate the value token, or describe the nature of the token (e.g., how much the token is worth).

A "scanning device" may include any suitable electronic device comprising an imaging device capable of capturing images and transmitting data to a network interface. Scanning devices are comprised of both hardware and software components. Examples of scanning devices include, but are not limited to, mobile communication devices (e.g., phones, personal digital assistants, laptop computers, etc.). Scanning devices can be portable or can be stationary. An example of a stationary scanning device can be an ATM (automated teller machine).

"Imaging device" may be any electronic or hardware device capable of capturing an image. Examples of imaging devices may be cameras and copiers. Imaging devices are typically incorporated into scanning devices, and scanning devices typically include more functionality than imaging devices. For example, a scanning device such as a phone may be capable of both short range contactless communication and long range communication over a cellular telephone network. However, an imaging device may simply be a camera in the phone and may not be configured for long or short range communication.

An "account identifier" can be a combination of letters, numbers, or both that is correlated with any suitable account in which funds may be requested upon by the account holder, who may be a user. Examples of suitable accounts may be checking accounts, point or reward accounts, virtual money accounts (e.g., Zynga™ dollars, Superpoke™ coins), or credit accounts. Not all merchants are capable of processing, or accepting payment through these accounts.

In embodiments of the invention, a "one-time use account identifier" is an example of a "temporary use account identifier." Both are generated for a user to use as an acceptable form of payment to a merchant. A temporary use account identifier may be used one or more times, but is not used indefinitely like a permanent account identifier. Typically, a temporary use account identifier is used less than 10, 5, or 2 times, before it expires and is incapable of further use. The temporary or one-time use account identifier may be a combination of letters, numbers, or both, and may be in a payment card account identifier format or virtual payment card account identifier format. An exemplary payment card account identifier format may include a primary account number such as 4288 1111 0000 5172 and an expiration date such as 01/2013.

In some embodiments, the temporary or one-time use account identifier can be used at a merchant, and can be generated to correlate to a value token, where the value token is not accepted by the merchant for payment. For example, the temporary or one-time use account identifier may be associated with a check, and can be in the form of a credit or debit card account number and may be readily accepted by a merchant which accepts credit or debit cards. That merchant may not accept the check, because the check may be considered a risky form of payment. Alternatively, if the value token is associated with virtual currency, that merchant may simply not accept the virtual currency as a form of payment.

In embodiments of the invention, a "prepaid account identifier" can be an identifier associated with a prepaid card. The prepaid account identifier may be associated with a prepaid account that may be loaded or funded multiple times and can be used for multiple transactions. A prepaid account identifier may be a combination of letters, numbers, or both, and may be in a payment card format.

A "payment card account identifier format" can be a format of a payment card account identifier. Payment card account identifier formats may include formats associated with payment cards such as credit card, debit cards, or prepaid cards. Typically, payment card account identifiers may include at least a primary account number (PAN) that is about 16-18 digits in length, and can optionally include a value such as an expiration date or a verification value (a CVV or card verification value). The PAN may include a BIN (bank identification number), which is typically six digits long and identifies an issuing institution.

"Clearing and settling" can be any suitable process in which an issuer, settlement network, acquirer, and/or bank(s) communicate to clear and settle financial transactions. Some clearing and settlement networks can be used to clear and settle value token (e.g., checking) transactions, while other clearing and settlement networks can be used to clear and settle payment card transactions.

A "financial transaction" may be any transaction that involves the movement of funds. Examples may include a payment transaction, a request for funds, a transfer of funds, or a deposit of funds. Financial transactions may be conducted with merchants, banks, issuers, settlement networks, acquirers, payment processing networks, other users, or service providers.

A "payment card" can include any suitable card that can be used to conduct payment transaction, and can include a credit card, debit card, or charge card.

A "demand account" may include any suitable account in which funds may be requested upon the demand of the account holder, who may be a user. Examples of demand accounts include checking accounts, money market accounts, and brokerage accounts. It may also include accounts with points or other suitable form of value.

An "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. An authorization request message may include an account number, service code, verification values (e.g., CVV values), etc.

A "server computer" can be a powerful computer or a cluster of computers. For example, the server computer can be a large mainframe, a minicomputer cluster, or a group of servers functioning as a unit. In one example, the server computer may be a database server coupled to a Web server.

Figure 1:
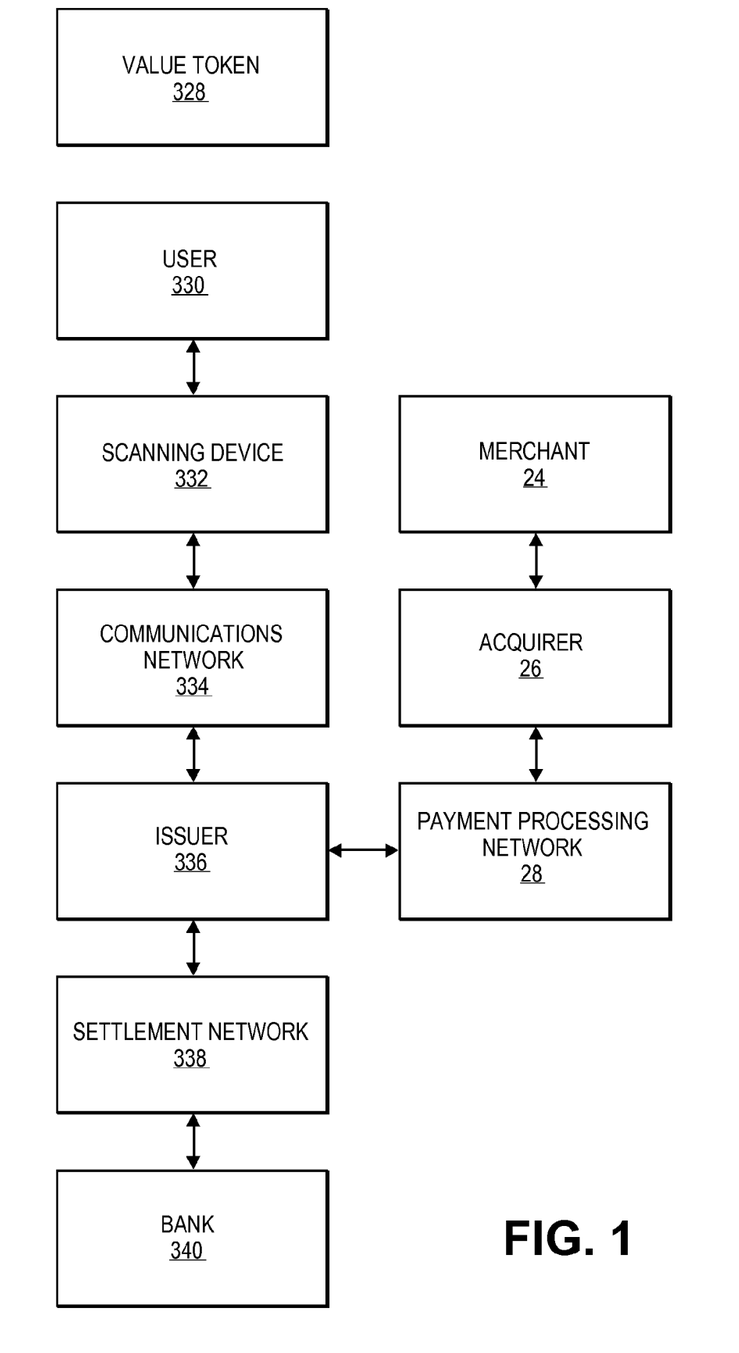
FIG. 1 shows a block diagram of a system according to an embodiment of the invention.

FIG. 1 shows a system according to an embodiment of the invention. FIG. 1 shows a user 330 that that can operate a scanning device 332, which can be used to scan a value token 328. The scanning device 332 may be a phone, ATM, or any other suitable device that has an image capture device. Further, in some embodiments, the image capture device may include a camera.

The scanning device 332 may be operatively coupled to a communications network (e.g., the Internet, or a telecommunications network) 334, and may in turn be operatively coupled to an issuer 336. The issuer 336 may be operatively coupled to a bank 340 (or other financial institution such as a credit union) that holds a checking account for the value token 328 via a settlement network 338. The settlement network 338 conducts the clearing and settlement between the issuer 336 of the temporary use account identifiers and the bank 340 that holds the accounts associated with the value tokens 328.

Each of the scanning device 332, the communications network 334, the issuer 336, the settlement network 338, the bank 340, the payment processing network 28, the acquirer 26, and the merchant 24, may include one or more components of one or more computer apparatuses (such as the one shown in FIG. 10).

The payment processing network 28 may include data processing subsystems and networks, and be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

Figure 2:
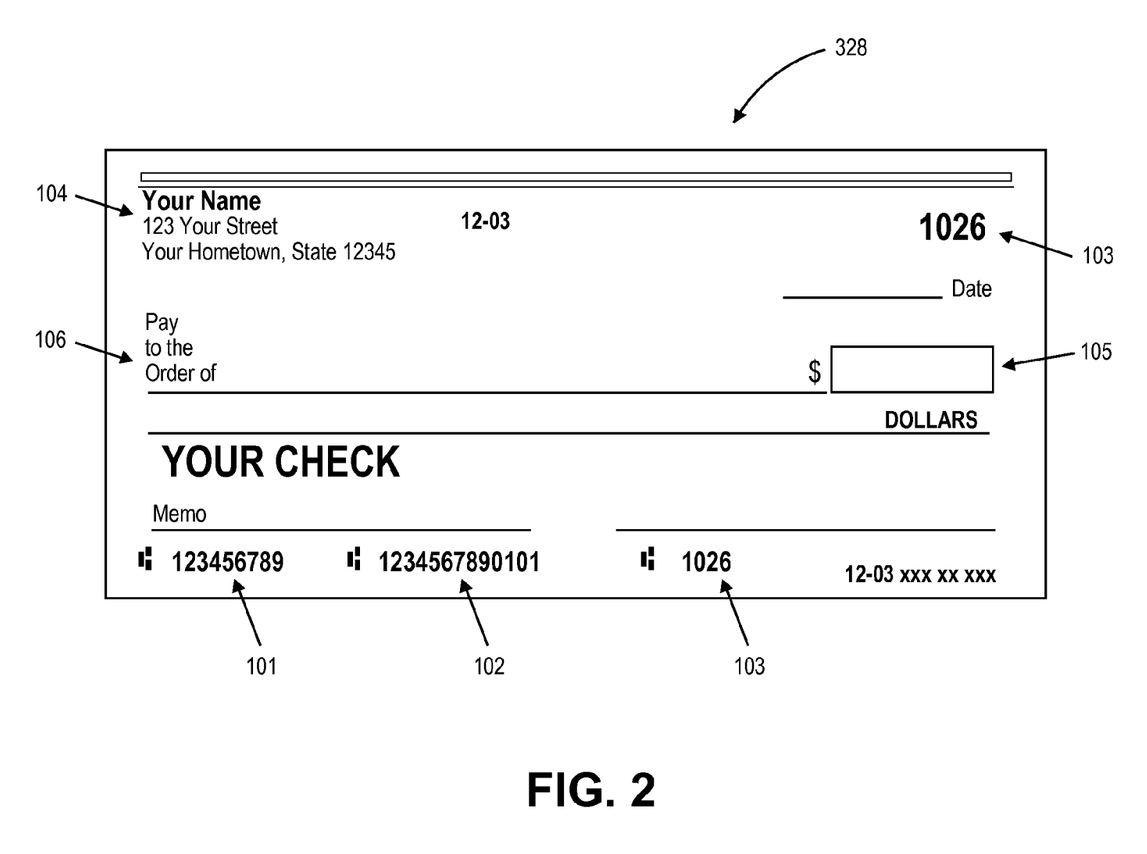
FIG. 2 shows an exemplary value token according to an embodiment of the invention.

As noted above, data needs to be extracted from the value token 328. The scanning device 332 captures an image of the value token. FIG. 2 shows an exemplary image of a value token such as a personal check. The image of the value token contains value token image data that can be extracted from the image via optical character recognition (OCR), magnetic ink character recognition (MICR), or any other data conversion process to convert an image to data.

Some of the value token image data that can be extracted is shown in FIG. 2. The value token image data may include user contact information 104, such as name and address. In some embodiments of the invention, the user 330 is also an account holder, wherein the account is the account associated with the value token 328. To identify the account, an account identifier 102 may be located on the value token 328. The account identifier 102 can vary in length, and can be a combination of letters, numbers, or both. In the embodiment where the value token 328 is a personal check, there may also be a bank routing and transit identifier (e.g., ABA routing number, BIC, RTN) 101 to identify the bank 340 holding the account identified by the account identifier 102. As shown in FIG. 2, the value token 328 may also comprise a region for a transaction amount 105 and a region for listing a payee 106.

Additional value token image data may include a check number 103 or memo note to indicate what the value token 328 is being used for. In other embodiments where the value token 328 may be a gift certificate or voucher, the account identifier 102 may refer to a rewards account, virtual money account, or any other account containing value funds. The user contact information 104 may also include phone number or email address.

Figure 3:
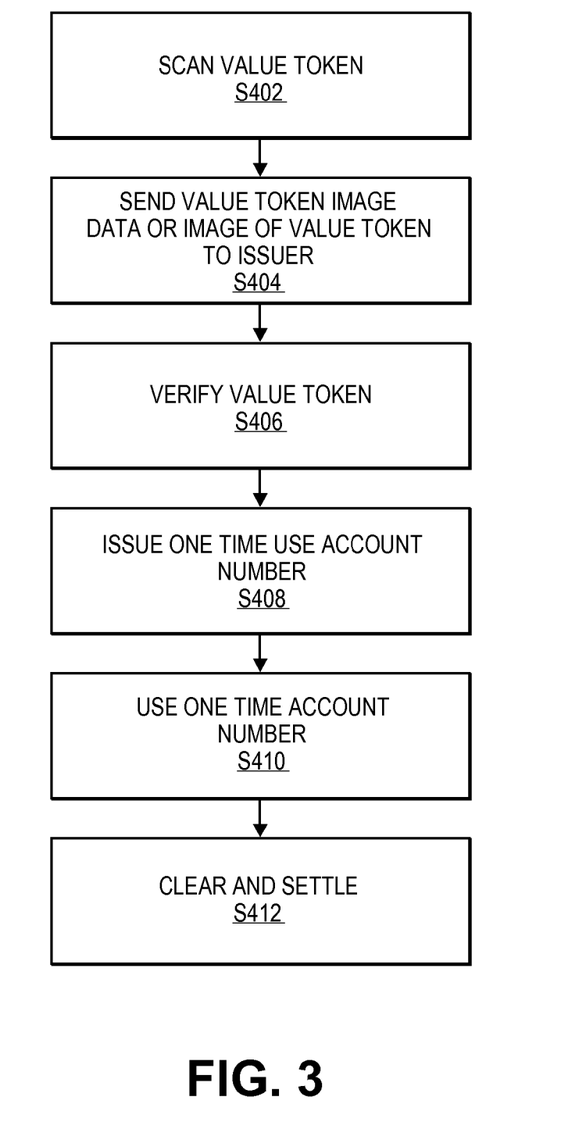
FIG. 3 shows a flowchart illustrating a method according to an embodiment of the invention.

A method according to an embodiment of the invention can be described with reference to FIG. 3, which shows a flowchart illustrating an embodiment of the invention. In the illustration below, functions performed by the issuer 336, payment processing network 28, acquirer 26, settlement network 338, and bank 340, can be performed by respective server computers (e.g., an issuer server computer) operated by the respective entities.

I. Use of Temporary Account Identifiers

Referring to step S402, a user (e.g., a consumer) 330 uses a suitable scanning device 332 (e.g., a personal computer (PC), mobile device equipped with a built-in or peripheral camera, MICR scanner) to capture an image of a value token 328. The value token may be made payable to cash or to the issuer 336, if it is a demand instrument such as a check. The user 330 may scan the value token 328 in any suitable manner and capture an image of the value token containing value token image data using the scanning device 332. The value token image data may include: (a) RTN (routing and transit number), (b) account identifier, (c) value token number, (d) amount, (e) account holder or user name, (f) account holder or user address, (g) account holder or user phone number, (h) bank name, (i) memo field, and (j) visual check security features. In other embodiments, the user 330 may swipe the MICR line on the value token 328, such as a check, using the scanning device 332 to capture the value token image data, which may include: (a) RTN, (b) account identifier, and (c) check number.

Referring to step S404, the scanning device 332 may then transmit the image of the value token or value token image data to an issuer 336 via a communications network 334 (e.g., the Internet, telecommunications network). In some embodiments of the invention, the scanning device 332 may have an application to perform OCR or other suitable image processing application to convert the image of the value token into value token image data, and the scanning device 332 can directly transmit the value token image data to the issuer 336 instead of or in addition to the image of the value token. In other embodiments of the invention, the scanning device 332 transmits the image of the value token data, and the issuer 336, or another party, performs the image processing application (e.g., OCR, MICR) to convert the image of the value token into value token image data. In either case, a central server computer operated by the issuer 336 (or some other entity) can obtain the value token image data, which is derived from the value token image. In addition, regardless of which process is used, the image of the value token or the value token image data may be encrypted by the scanning device 332 before it is sent to the central server computer operated by the issuer 336.

Referring to step S406, the issuer 336 or a third party underwriter (such as issuer 336) then decides whether or not to issue a one-time-use card number, and decides the amount they'd like to authorize for use. In embodiments of the invention, the issuer 336 may initiate (e.g., either start the verification process or cause some other entity to start the verification process) a verification process. Verification of the value token can include checking to see if the verification token or the user providing the verification token is authentic, or checking to see if the verification token is authentic (i.e., not fraudulent) and/or has sufficient funds to conduct the transaction. For example, the issuer 336 (or underwriter) can perform one or more of the following: (a) a user credit check, (b) a velocity check on the user's name, account, IP address, etc., (c) verification of transaction limits, and (d) check of the user's DDA balance (as available). The issuer 336 or third party underwriter could have a server computer with software modules for performing these and other functions.

Referring to step S408, once the issuer 336 has verified the value token 328 to the extent desired by the issuer 336, the issuer 336 can generate a one-time use account identifier corresponding to the value token. The account associated with the one-time use account identifier may have a fixed value, duration, or set of authorized acceptors (e.g., merchants). The issuer 336 may verify the value token to any appreciate extent, because in some cases, the issuer 336 is assuming the risk that it will be paid for the value token 328 that it is receiving in exchange for the issued one-time use account identifier. As noted above, the one-time use account identifier may be in a payment card account identifier format.

In embodiments of the invention, the issuer 336 (or underwriter as the case may be) may charge the user 330 a fee for this convenience. The fee may be a percentage of the transaction being conducted (e.g., 1%).

The one-time use account identifier may then be securely transmitted via a communication network 334 to the user 330 or the user's scanning device 332. It may include new card account information (may be full card embossing personalization data or just PAN, CVV2, and expiration date) for the user to the use. In some embodiments of the invention where the user's scanning device 332 may be a mobile device, the one-time use account identifier transmission may also include: (a) data to be presented within a user interface application; and (b) data to be populated in the secure element of the mobile device.

Referring to step S410, after the user 330 receives the one-time-use account identifier, the user 330 may use that identifier to purchase goods and services at a merchant 24. The user 330 may present the identifier to the merchant 24 (e.g., through the Internet or in person) to purchase a good or service. An access device, such as a point-of-sale terminal at the merchant 24 may then send an authorization request message with the account identifier, the transaction amount, and other information to the issuer 336 via the acquirer 26 and the payment processing network 28 requesting authorization for the transaction. The issuer 336 may authorize (or not authorize) the transaction and an authorization response message indicating approval (or disapproval) of the transaction may be sent to the merchant via the payment processing network 28 and the acquirer 26. At some later point in time, a payment card clearing and settlement process involving the one-time use account identifier can occur, as well as the merchant's acquirer 26 and the issuer 336 can occur.

Referring to step S412, at some point in time, before or after the one time use account number has been issued, a settlement process may occur between the issuer 336 and the bank 338 that issued the value token 328. The settlement network 334 may be used to facilitate the settlement process involving the value token 328.

Figure 4:
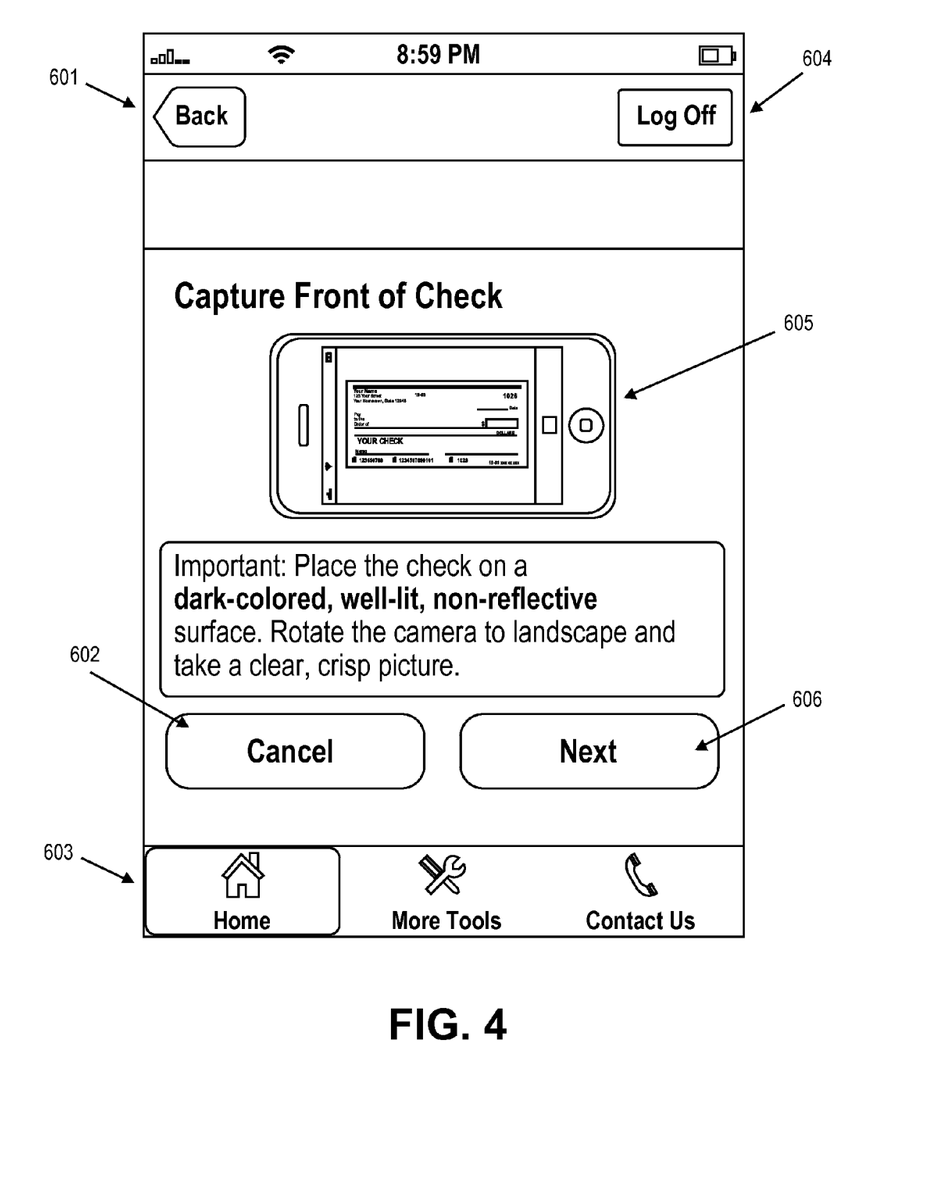
FIG. 4 shows an exemplary screenshot viewed by a user implementing an embodiment of the invention.

In some embodiments of the invention, the scanning device 332 may be a mobile device. Many mobile devices are capable of capturing images and downloading applications customized for the user's mobile device and usage. FIG. 4 shows an exemplary screen shot of an exemplary mobile device application for obtaining a one-time use account identifier for a value token. Instructions 605 may be provided to the user on how to successfully capture an image of a value token 328 to obtain a one-time use account identifier. If the user does not wish to continue to obtain the one-time use account identifier, the user can select a cancel button 602 to cancel the process, and select a log off button 604 to log off. If the user 330 wishes to retake another image, or return to the previous screen, the user can select a "back" button 601. If the user wishes to continue with the process to capture an image of the value token 328 and obtain a one-time use account identifier, the "next" button 606 may be used to do so. Additional buttons 603 provide a navigation and settings menu for the user 330 for the exemplary mobile device application.

Figure 5:
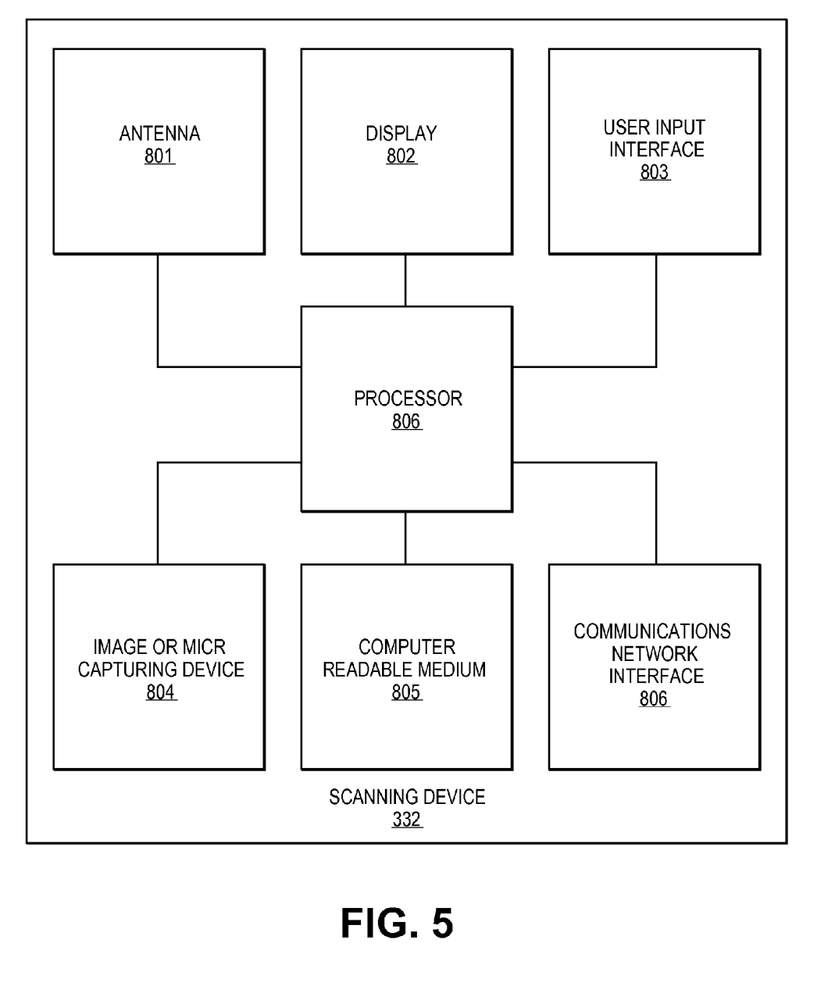
FIG. 5 shows a block diagram of a scanning device according to an embodiment of the invention.
Figure 6:
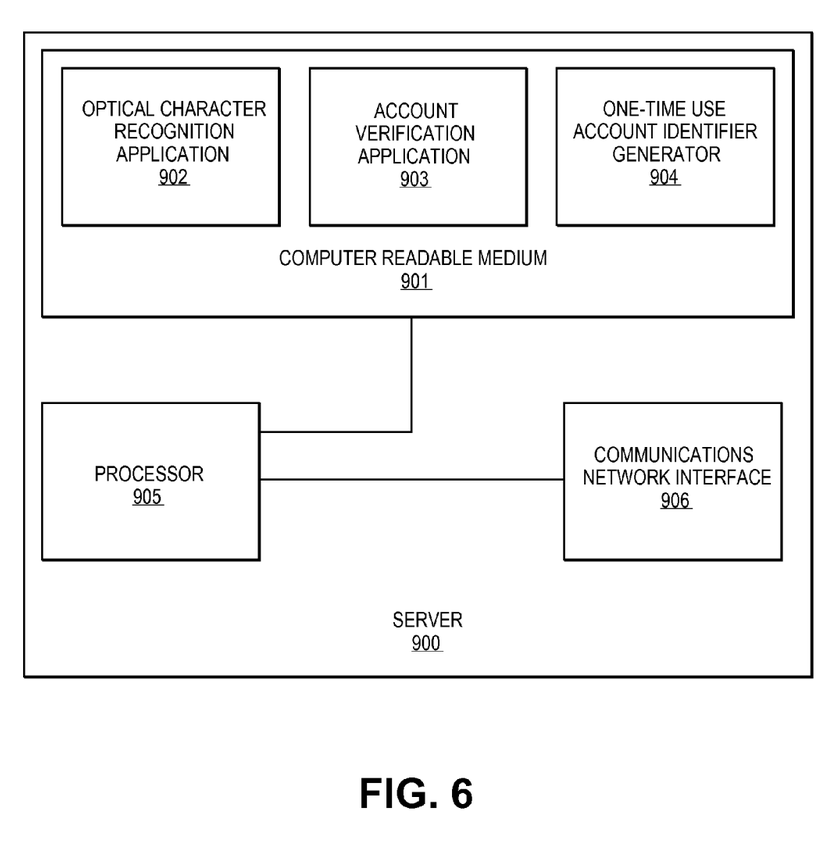
FIG. 6 shows a block diagram of a server computer apparatus according to an embodiment of the invention.

FIG. 5 shows a block diagram illustrating functional components in a scanning device 332. The scanning device 332 may contain both hardware and software components, wherein the software components may be executable code stored in the computer-readable storage medium 805. Suitable scanning devices according to embodiments of the invention may also include a display 802, user input interface (e.g., touchscreen or keypad) 803, and image capturing device 804. These components may be used by the user 330 to capture an image of a value token 328 and may be coupled to the processor 806. The processor 806 may then execute the code stored in the computer-readable storage medium 805 to perform image processing applications (e.g., MICR, OCR) or run mobile device applications, as shown in FIG. 6. The scanning device 332 may also include an antenna 801 and communications network interface 806 to enable the scanning device 332 to be coupled to a communications network 334 and transmit the image of the value token, or value token image data.

The computer readable medium 805 may comprise code executable by the processor 806, for performing a number of methods. In one embodiment, the method may include capturing an image of a value token; generating value token image data for the image of the value token; transmitting the value token image data; and receiving a temporary use account identifier, wherein the temporary use account identifier is correlated with the value token. In another embodiment, the method may include capturing an image of a value token using an imaging device in a scanning device; generating value token image data for the image of the value token; transmitting the value token image data to a server computer; and receiving a notification that a prepaid account has increased in value.

The issuer 336 may include a server computer 900 as shown in FIG. 6. The server computer 900 may have a communications network interface 906 to couple to any suitable communications network 334, including the Internet, to facilitate communications and data transfer between its component system elements. The server computer 900 may comprise both hardware and software components. The software components may comprise code stored in the computer-readable storage medium 901, executable by the processor 905.

The code stored in the computer-readable medium 901 may perform functions, and may include, an optical character recognition application 902 (or any other suitable image processing application), an account verification application 903, and one-time use account identifier generator 904.

The computer readable medium 901 may comprise code, executable by the processor 905 for implementing a number of methods. In one embodiment, the method includes obtaining value token image data associated with the image of the value token, the value token image data being derived from an image of the value token obtained from a scanning device; initiating verification of the value token image data; providing a temporary use account identifier correlated with the value token; and sending the temporary account identifier to a user. In another embodiment, the method includes obtaining value token image data associated with the image of the value token, the value token image data being derived from an image of the value token obtained from a scanning device; initiating verification of the value token; and increasing a value of a prepaid account.

When an image of a value token has been received the optical character recognition application may process the image into value token image data. This value token image data may be used in the account verification application 903 to verify the value token image data, coupled with the processor 905 and communications network interface 906. Once the value token image data has been verified and authorized, the one-time use account identifier generator 904 may generate a one-time use account identifier. This one-time use account identifier may then be transmitted via the communications network interface 906.

Although the server computer 900 can reside at the issuer in this embodiment, it can reside at the payment processing network or other entities in other embodiments. Such entities may act on behalf of the issuer.

Figure 7:
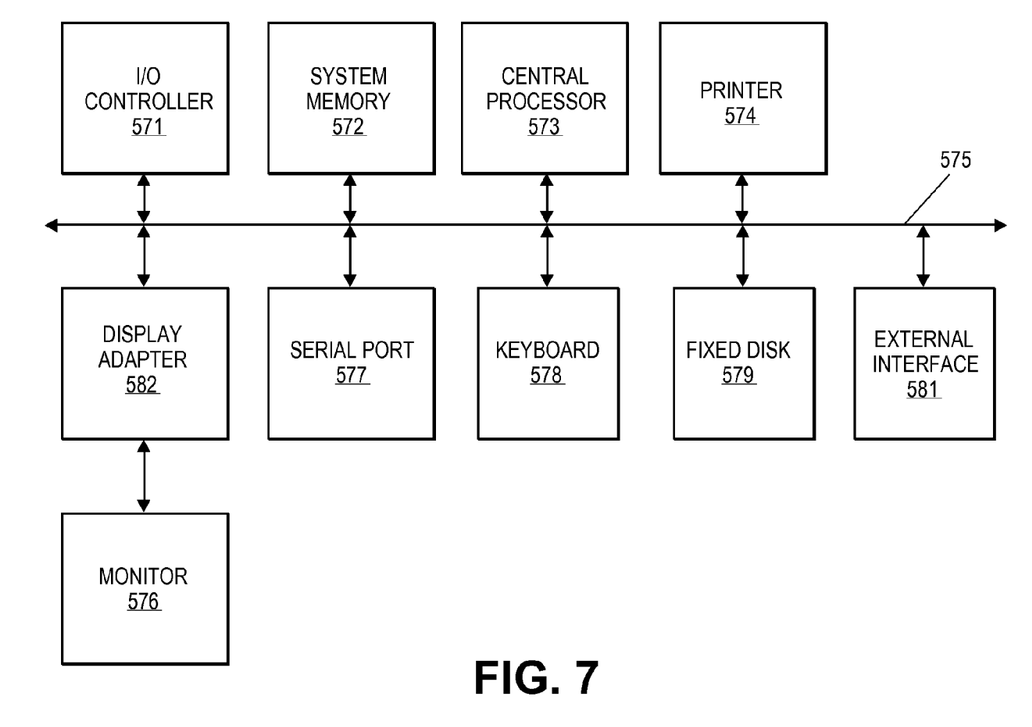
FIG. 7 shows a block diagram illustrating components in a computer apparatus according to an embodiment of the invention.

FIG. 7 shows a block diagram of subsystems that may be present in computer apparatuses that are used in system shown in FIG. 1. The various participants and elements in the previously described Figures may operate using one or more computer apparatuses to facilitate the functions described herein. Any of the elements in the Figures may use any suitable number of subsystems to facilitate the functions described herein. Examples of such subsystems or components are shown in FIG. 7. The subsystems shown in FIG. 7 are interconnected via a system bus 575. Additional subsystems such as a printer 574, keyboard 578, fixed disk 579 (or other memory comprising computer readable media), monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 can be used to connect the computer apparatus to a wide area network such as the Internet, a mouse input device, or a scanner. The interconnection via system bus allows the central processor 573 to communicate with each subsystem and to control the execution of instructions from system memory 572 or the fixed disk 579, as well as the exchange of information between subsystems. The system memory 582 and/or the fixed disk 579 may embody a computer readable medium.

Embodiments of the invention provide many advantages, both for the merchant and users. As mentioned before, merchants take significant risk in accepting personal checks and may not be enabled to process personal checks or other value tokens, such as gift certificates. Embodiments of the invention provide merchants with more security since the value token is verified and authenticated prior to issuing a one-time use account identifier. Therefore, when the user uses a one-time use account identifier to conduct a financial transaction with a merchant, the merchant can be assured that the one-time use account identifier has already been verified, authenticated, and cleared.

Other advantages of embodiments of the invention are directed towards the users. Converting value tokens into a one-time use account identifier accepted at all merchants grants the users much more flexibility and variety in the forms of payment that the user can implement to conduct a financial transaction. Additionally, with the movement towards paperless transactions, issuing one-time account identifiers (or temporary account identifiers) electronically in place of paper documents provides convenience, speed, and ease to users wishing to make financial transactions with all merchants, even merchants that do not accept value tokens.

II. Adding Value to Prepaid Accounts

Other embodiments of the invention can relate to adding value to existing prepaid accounts or adding value to new prepaid accounts using scanning devices.

Figure 8:
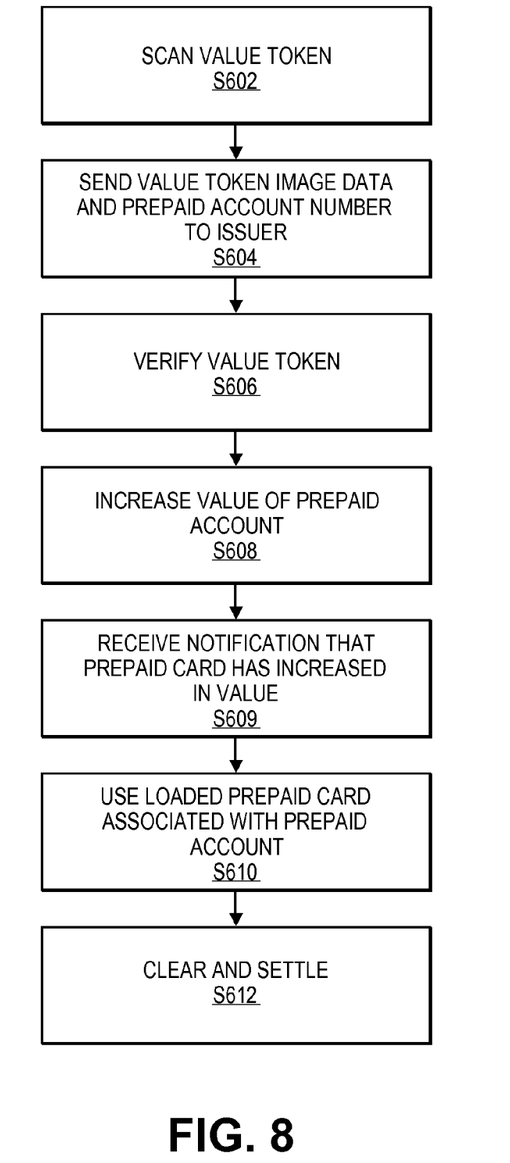
FIG. 8 shows a flowchart illustrating another embodiment of the invention.

Referring to FIG. 8, in another embodiment of the invention, the user 330 may have an existing prepaid account associated with a prepaid card and may wish to load funds into the prepaid account using the scanning device 332.

In steps S602, S604, and S606, the user 330 may scan a value token with a scanning device 332, the value token image and/or the value token image data can be sent to the issuer 336, and the issuer can verify the value token. Steps 602, 604, and S606 can be similar to steps 402, 404, and 406 above, and the descriptions above are incorporated herein and need not be repeated here.

However, in step S604, a prepaid account identifier (e.g., a prepaid account number) can be sent to the issuer 336 along with the value token image data and/or the value token image that is sent to the issuer 336 if the prepaid account number is pre-existing. If the prepaid account is not pre-existing, then the user can provide an indication that a new prepaid account and new prepaid card is to be issued upon receipt of the value token image data. This indication can be provided via a button or other data entry field in the scanning device. In other embodiments, the prepaid account number or the indication that a new account is to be opened can be sent to the issuer 336 in a different transmission than the value token image data and/or the value token image.

In step 608, assuming that the issuer 336 is satisfied that the verification token 328 is verified, it can increase the value of the prepaid account by the amount of the verification token 328. For example, if the verification token is a $20 check, and if the prepaid card associated with the prepaid account is currently loaded with $10, then the re-loaded prepaid card could have $30 on it after the issuer 336 verifies the check. As in the temporary use identifier example above, the issuer 336 may take on some risk that the check (or other value token) will not be paid or is fraudulent. In both embodiments, the issuer 336 (or underwriter as the case may be) may charge the user 330 a fee for this convenience. The fee may be a percentage of the transaction being conducted (e.g., 1%).

In some embodiments, to expedite transaction processing, a portion (e.g., 10-20% or less) of the value token amount may be instantly transferred directly to the prepaid account for immediate use. When the value token has been cleared and settled, the remainder of the value token amount may be transferred to the prepaid account. The prepaid account can be reloaded multiple times through various means, including, but not limited to, transfers from other account identifiers, depositing of multiple personal checks, direct deposit, etc.

Furthermore, the prepaid account may be used and reused for multiple transactions as long as there are sufficient funds in the prepaid account.

Referring to step S609, the user 330 receives notification that the user's prepaid card has been increased in value (i.e., loaded or re-loaded). Then, in step S610, the user 330 may use that prepaid card to purchase goods and services at a merchant 24. For example, the issuer 336 can send an electronic message such as an e-mail message, a text message, or a voice activated message, to inform the user 330 that a prepaid card or account has been issued, loaded, or re-loaded.

The user 330 may present the prepaid card to the merchant 24 (e.g., through the Internet or in person) to purchase a good or service. An access device, such as a point-of-sale terminal at the merchant 24 may then send an authorization request message with the account identifier, the transaction amount, and other information to the issuer 336 via the acquirer 26 and the payment processing network 28 requesting authorization for the transaction. The issuer 336 may authorize (or not authorize) the transaction and an authorization response message indicating approval (or disapproval) of the transaction may be sent to the merchant via the payment processing network 28 and the acquirer 26. At a later point in time, a payment card clearing and settlement process involving the prepaid account can be conducted.

Referring to step S612, at some point in time after the one time use account number has been issued, a settlement process involving the value token may occur between the issuer 336 and the bank 338 that issued the value token 328. The settlement network 334 may be used to facilitate the settlement process.

Advantages of these embodiments of the invention provide users with more payment options, such as reloadable and reusable prepaid account identifiers. Many users already have existing prepaid accounts that they use to conduct payment transactions. It would be advantageous to be able to fund existing prepaid accounts with funds from one-time use account identifiers correlated with value tokens efficiently. Instantly funding a portion of the value token amount to an existing prepaid account while the value token is being cleared and settled expedites the processing time and allows the user to use his or her prepaid account identifier immediately. Once the value token has been cleared and settled with an issuing bank, the remainder of the funds may be transferred to the one-time use account identifier, which may be used to reload the prepaid account, or used one-time in a single purchase transaction.

Specific details regarding some of the above-described aspects are provided. The specific details of the specific aspects may be combined in any suitable manner without departing from the spirit and scope of embodiments of the disclosure. Further, although some steps in the methods described above are described in a particular order, embodiments of the invention are not limited to the described order of steps and can include methods with steps in different orders.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer apparatus comprising a processor and a non-transitory computer-readable storage medium, comprising code executable by the processor for implementing a method comprising:
    obtaining value token image data associated with an image of a value token, the value token image data being derived from an image of the value token obtained from a scanning device;
    initiating verification of the value token;
    providing a temporary use account identifier correlated with the value token;
    sending the temporary use account identifier to a user, wherein the user thereafter uses the temporary use account identifier to conduct a transaction; and
    settling the value token after sending the temporary use account identifier and after the user uses the temporary use account identifier.

2. The server computer apparatus of claim 1, wherein the scanning device is a mobile device capable of capturing images.

3. The server computer apparatus of claim 1, wherein the temporary use account identifier is a one-time use account identifier, and wherein the one-time use account identifier is in a payment card account number format.

4. The server computer apparatus of claim 2, wherein sending the temporary use account identifier to the user comprises transmitting the temporary use account identifier to the scanning device.

5. A method comprising:
    obtaining value token image data associated with an image of a value token, the value token image data being derived from an image of the value token obtained from a scanning device;
    initiating verification of the value token image data;
    providing a temporary use account identifier correlated with the value token;
    sending the temporary use account identifier to a user, wherein the user thereafter uses the temporary use account identifier to conduct a transaction; and
    settling the value token after sending the temporary use account identifier and after the user uses the temporary use account identifier.

6. The method of claim 5, wherein the scanning device is a mobile device capable of capturing images.

7. The method of claim 5, wherein the temporary use account identifier is a one-time use account identifier, and wherein the one-time use account identifier is in a payment card account number format.

8. The method of claim 5, further comprising transmitting the temporary account identifier to the scanning device.

9. A scanning device, comprising:
a processor;
an imaging device capable of capturing images; and
a non-transitory computer-readable medium coupled to the processor, the non-transitory computer-readable medium comprising code executable by the processor for implementing a method comprising:
capturing an image of a value token;
generating value token image data for the image of the value token;
transmitting the value token image data; and
receiving a temporary use account identifier, wherein the temporary use account identifier is correlated with the value token, wherein the temporary use account identifier is thereafter used to conduct a transaction, and further wherein the value token is settled after receiving the temporary use account identifier and after the temporary use account identifier is used to conduct the transaction.

10. The scanning device of claim 9 wherein the imaging device is a camera, scanner, MICR scanner, or a web camera.

11. The scanning device of claim 9 wherein the scanning device is capable of receiving and transmitting SMS, text, MMS, or e-mail messages via a network interface.

12. The scanning device of claim 9 wherein the temporary use account identifier is a one-time use account identifier that is in a payment card number format.

13. The scanning device of claim 9, wherein the scanning device is a phone.

14. A method comprising:
capturing an image of a value token using an imaging device in a scanning device;
generating value token image data for the image of the value token;
transmitting the value token image data; and
receiving a temporary use account identifier, wherein the temporary use account identifier is correlated with the value token, wherein the temporary use account identifier is thereafter used to conduct a transaction, and further wherein the value token is settled after receiving the temporary use account identifier and after the temporary use account identifier is used to conduct the transaction.

15. The method of claim 14, wherein the imaging device is a camera, scanner, MICR scanner, or a web camera.

16. The method of claim 14, wherein the scanning device is capable of receiving and transmitting SMS, text, MMS, or e-mail messages via a network interface.

17. The method of claim 14, wherein the temporary use account identifier is a one-time use account identifier that is in a payment card number format.

18. A method comprising:
capturing an image of a value token using an imaging device in a scanning device;
generating value token image data for the image of the value token;
transmitting the value token image data to a server computer; and
receiving a notification that a prepaid account has increased in value before the value token is settled.

19. A non-transitory computer readable medium comprising code executable by a processor for implementing the method of claim 18.

20. A scanning device comprising the non-transitory computer readable medium of claim 19.

21. The server computer apparatus of claim 1, wherein the value token is a check, gift certificate, or a voucher.

22. The server computer apparatus of claim 1, wherein the temporary use account identifier is associated with a rewards account or a virtual money account.

* * * * *